United States Patent
Kazakov (10) Patent No.: US 12,248,789 B2
(45) Date of Patent: Mar. 11, 2025

(54) WAVEFRONT SELECTION AND EXECUTION

(71) Applicant: Advanced Micro Devices, Inc., Santa Clara, CA (US)

(72) Inventor: Maxim V. Kazakov, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/309,536

(22) Filed: Apr. 28, 2023

(65) Prior Publication Data

US 2023/0266975 A1 Aug. 24, 2023

Related U.S. Application Data (63) Continuation of application No. 17/219,775, filed on Mar. 31, 2021, now Pat. No. 11,656,877.

(51) Int. Cl.
*G06F 9/30* (2018.01)
*G06F 9/38* (2018.01)

(52) U.S. Cl.
CPC .......... *G06F 9/3885* (2013.01); *G06F 9/3012* (2013.01); *G06F 9/30152* (2013.01); *G06F 9/3836* (2013.01); *G06F 9/3851* (2013.01); *G06F 9/3869* (2013.01); *G06F 9/3887* (2013.01); *G06F 9/3889* (2013.01)

(58) Field of Classification Search
CPC .. G06F 9/3885; G06F 9/3012; G06F 9/30152; G06F 9/3836; G06F 9/3851; G06F 9/3869; G06F 9/3887; G06F 9/3889
See application file for complete search history.

(56) References Cited

U.S. PATENT DOCUMENTS

| | | | |
|---|---|---|---|
| 5,509,130 A * | 4/1996 | Trauben | G06F 9/3867 |
| | | | 712/E9.056 |
| 5,884,060 A | 3/1999 | Vegesna et al. | |
| 9,600,279 B2 * | 3/2017 | Jarboe | G06F 9/30021 |
| 10,055,229 B2 * | 8/2018 | Lyberis | G06F 9/3838 |
| 11,055,895 B2 * | 7/2021 | Oldcorn | G06T 1/20 |
| 2016/0055002 A1 | 2/2016 | Webber | |
| 2017/0017490 A1 | 1/2017 | Caulfield | |
| 2018/0276046 A1 | 9/2018 | Joao et al. | |
| 2019/0227805 A1 * | 7/2019 | Carlson | G06F 9/3885 |
| 2019/0332420 A1 | 10/2019 | Ukidave et al. | |
| 2020/0097297 A1 | 3/2020 | Behera et al. | |
| 2020/0371797 A1 * | 11/2020 | Rahman | G06F 7/487 |
| 2021/0272354 A1 * | 9/2021 | Nijasure | G06T 15/80 |

FOREIGN PATENT DOCUMENTS

EP 3300027 A1 3/2018

* cited by examiner

*Primary Examiner* — Corey S Faherty
(74) *Attorney, Agent, or Firm* — Volpe Koenig (57) ABSTRACT

Techniques are provided for executing wavefronts. The techniques include at a first time for issuing instructions for execution, performing first identifying, including identifying that sufficient processing resources exist to execute a first set of instructions together within a processing lane; in response to the first identifying, executing the first set of instructions together; at a second time for issuing instructions for execution, performing second identifying, including identifying that no instructions are available for which sufficient processing resources exist for execution together within the processing lane; and in response to the second identifying, executing an instruction independently of any other instruction.

20 Claims, 5 Drawing Sheets

WAVEFRONT SELECTION AND EXECUTION

CROSS REFERENCE TO RELATED APPLICATIONS

This application is a continuation of U.S. patent application Ser. No. 17/219,775, filed on Mar. 31, 2021, which is incorporated by reference as if fully set forth herein.

BACKGROUND

Graphics processing units include parallel processing elements that execute shader programs in a highly parallel manner. Improvements to efficiency for execution of shader programs are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques are provided for executing wavefronts. The techniques include at a first time for issuing instructions for execution, performing first identifying, including identifying that sufficient processing resources exist to execute a first set of instructions together within a processing lane; in response to the first identifying, executing the first set of instructions together; at a second time for issuing instructions for execution, performing second identifying, including identifying that no instructions are available for which sufficient processing resources exist for execution together within the processing lane; and in response to the second identifying, executing an instruction independently of any other instruction.

Figure 1:
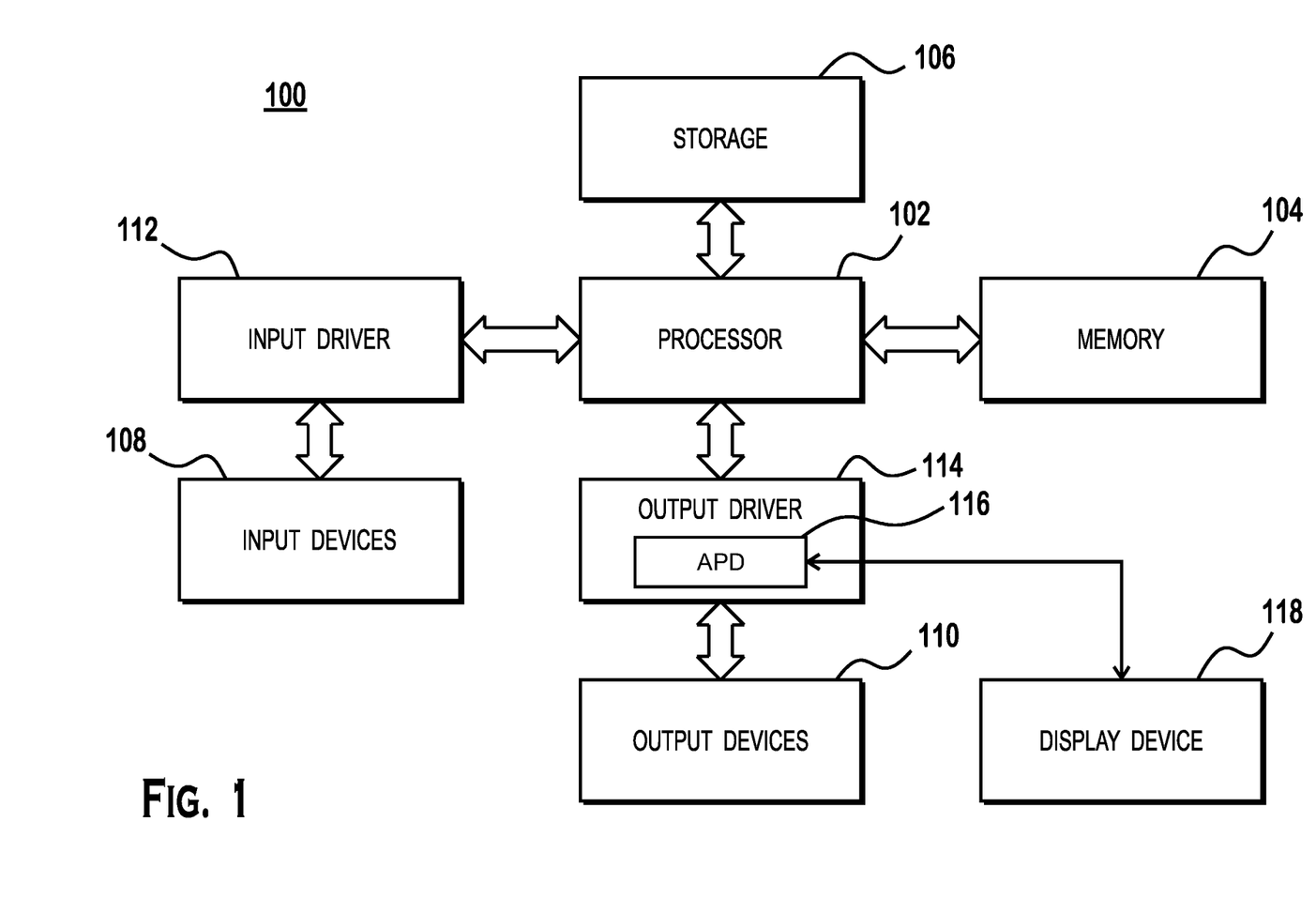
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
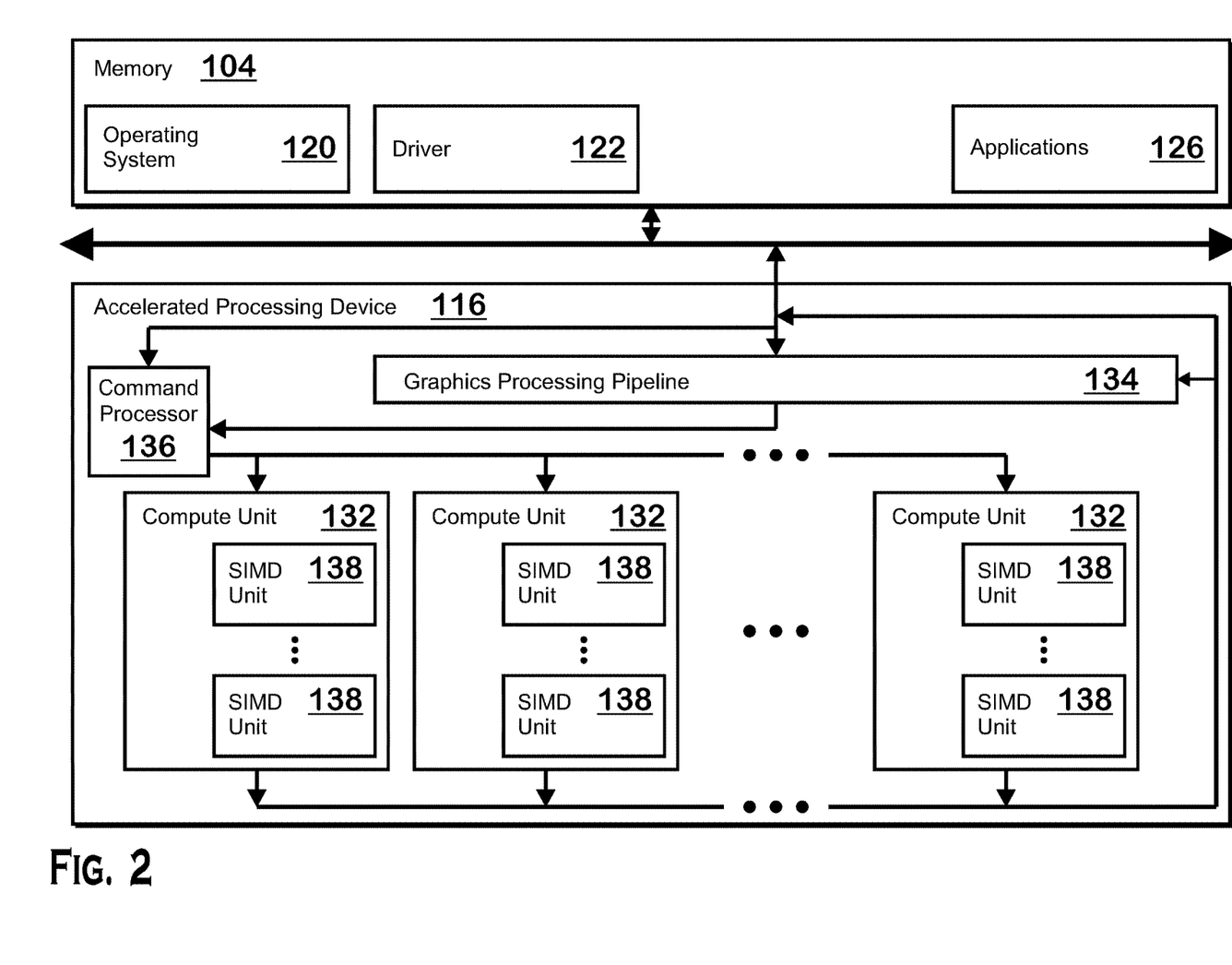
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138.

A command processor 136 performs operations related to scheduling various workgroups on different compute units 132 and SIMD units 138. In general, the command processor 136 receives commands from an entity such as the processor 102, where the commands instruct the APD 116 to perform tasks such as graphics rendering, executing general purpose shaders, or the like.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
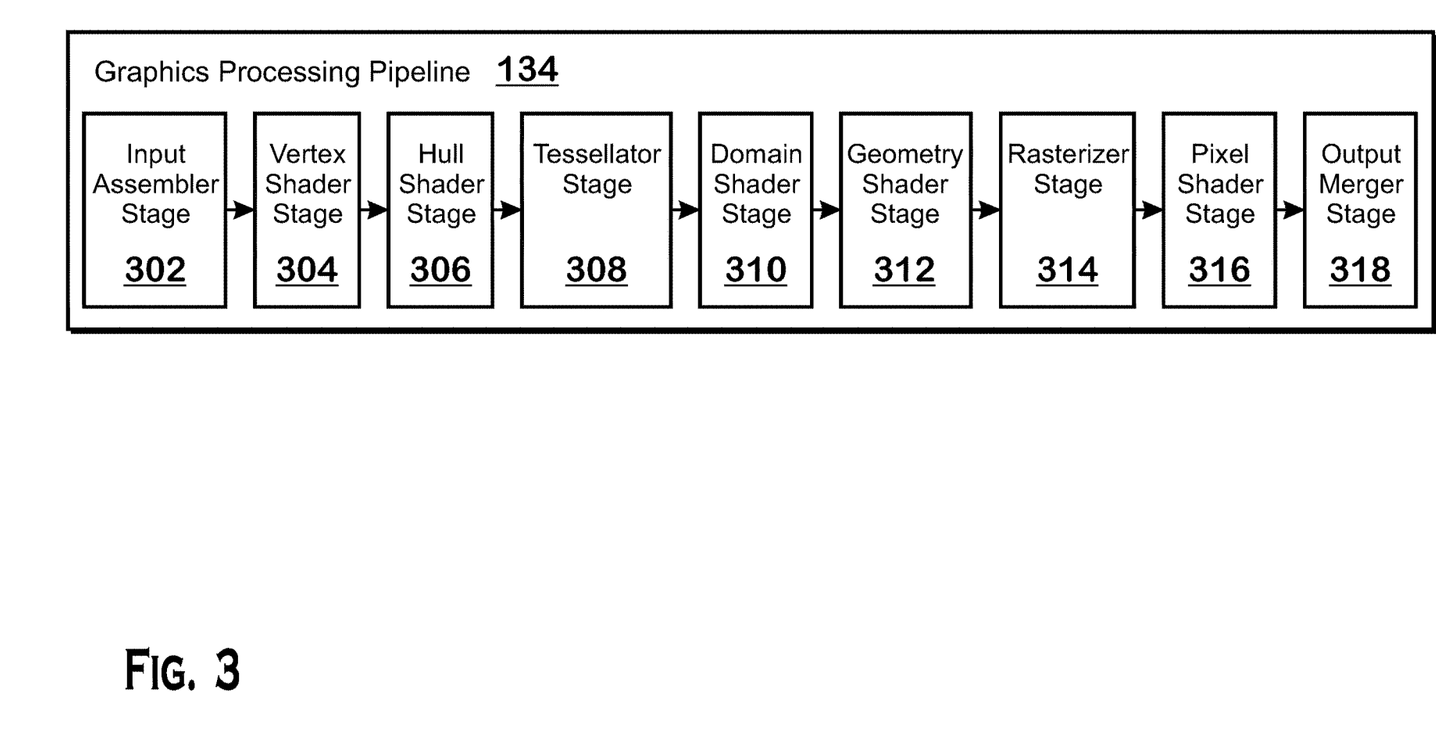
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

It should be understood that, although a graphics processing pipeline 134 is illustrated as included within the APD 116, implementations of the APD 116 that do not include a graphics processing pipeline 134 (but that do include the compute units 132 which execute shader programs such as general purpose compute shader programs) are contemplated by the present disclosure.

As described elsewhere herein, wavefronts include a plurality of work-items. The SIMD units 138 execute the wavefronts by executing work-items of the wavefront together in lockstep across lanes of the SIMD unit 138. The SIMD units 138 facilitate highly parallel execution in an efficient manner by utilizing the same instruction flow circuitry (e.g., instruction fetch and instruction pointer adjustment circuitry) for multiple instances of execution (the work-items). Each lane is provided with the functional hardware (such as arithmetic logic units and other circuitry for performing the instructions of the instruction set architecture of the APD 116, such as addition, subtraction, multiplication, division, matrix multiplication, transcendental functions, and other functions) for executing one instance of the instruction on the data for one work-item.

The hardware for executing all of these instruction types for one work-item per lane is sufficient to execute instructions for multiple work-items together per lane at the same time, if certain conditions are satisfied. For example, because the SIMD units 138 are capable of performing a matrix multiplication operation for each work-item, and because matrix multiplication includes a relatively large number of multiply-and-add operations, the SIMD units 138 have the hardware for executing multiple "simple" instructions such as multiply, add, or fused-multiply-and-add instructions at a higher rate than instructions for which such functional hardware is not so numerous. Although an increased execution rate for some instructions can be achieved in some cases, the hardware of the SIMD units 138 is sufficient to support only a "normal" rate of execution unconditionally. In other words, limitations to the execution rate exist for other reasons, such as register file bandwidth related limitations. Nevertheless, the SIMD unit 138 of the present disclosure attempts to execute instructions at a higher rate in a large number of situations.

The heightened rate of execution described above is sometimes referred to herein as "an increased execution rate." Execution of instructions without performing the techniques to increase execution rate is sometimes said to be performed at "a normal execution rate" herein. In one implementation, a distinguishing feature between the increased execution rate and the normal execution rate is that in the increased execution rate, each lane executes multiple instructions, whereas in the normal execution rate, each lane executes one instruction. It is possible for the multiple instructions executed in each lane in the increased execution rate to come from different wavefronts. Alternatively, it is possible for the multiple instructions to come from the same wavefront. For example, it is possible for the next instruction in program order to execute together with the instruction after that one in program order and from the same wavefront.

Figure 4:
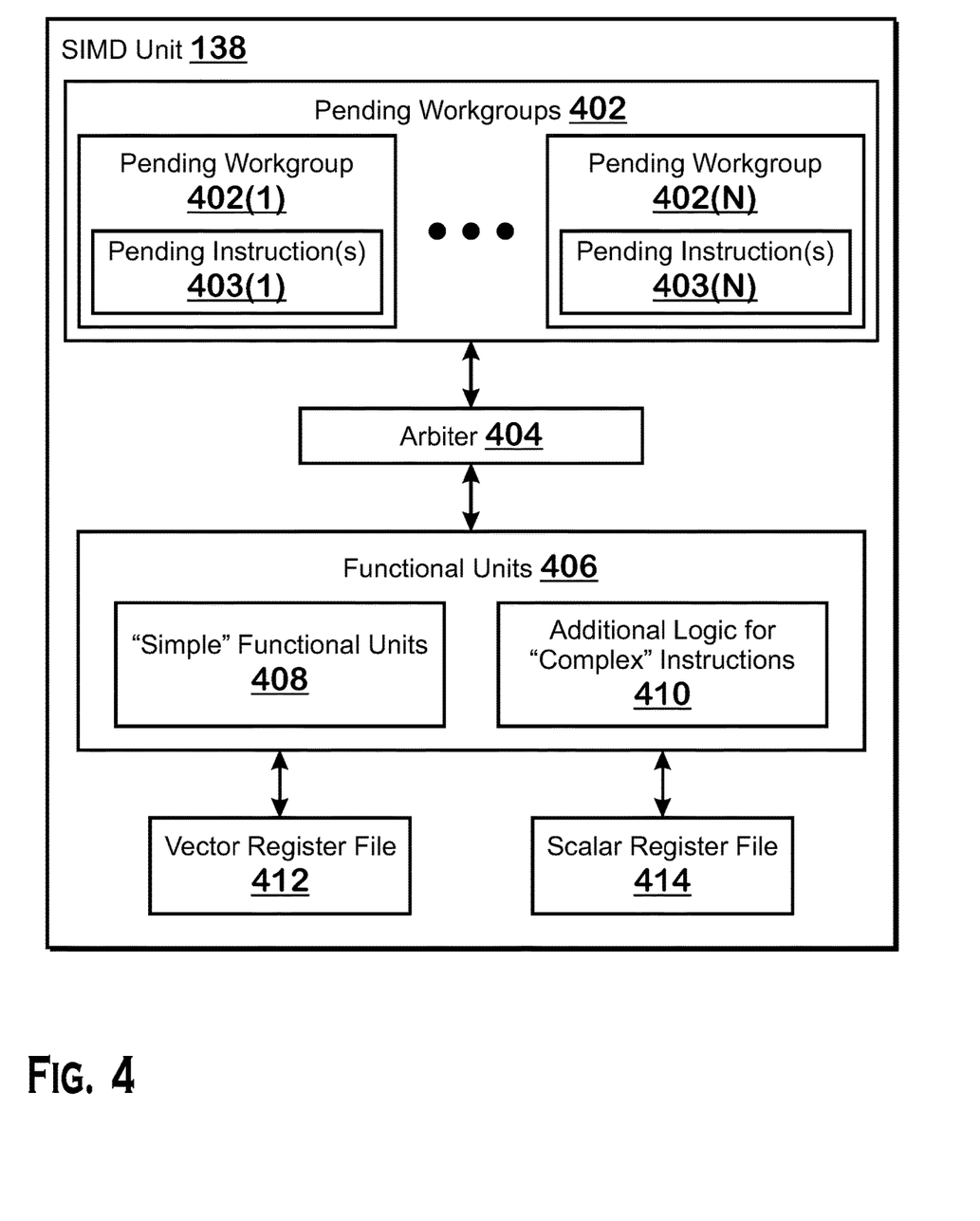
FIG. 4 illustrates details of a SIMD unit, according to an example.

FIG. 4 illustrates details of the SIMD unit 138, according to an example. In some examples, each of the illustrated blocks (e.g., the arbiter 404, the functional units 406, the vector register file 412, or the scalar register file 414) of the SIMD unit 138 is implementable in hard-wired circuitry configured to perform the operation described herein. In other embodiments, some or all of the illustrated blocks of the SIMD unit 138 are implemented as software executing on a processor or a combination of software and hardware circuitry.

The SIMD unit 138 of FIG. 4 includes functional units 406, an arbiter 404, a vector register file 412, and a scalar register file 414. The arbiter 404 is configured to select one or more pending instructions 403 from one or more pending workgroups 402 for execution. Each pending wavefront 402 is a wavefront that is assigned to the SIMD unit 138 for execution. In various examples, this assignment is performed by a scheduler in the compute unit 132 or by another scheduler not described in detail. In some implementations, the SIMD unit 138 is "oversubscribed" for latency hiding purposes. The term "oversubscribed" means that there are several workgroups that are assigned to the SIMD unit 138, and that the SIMD unit 138 does not have sufficient hardware (e.g., functional units 406) to execute each of these assigned workgroups at the same time. Thus, the SIMD unit 138 takes turns scheduling instructions from different workgroups. Latency hiding occurs because the workgroups sometimes stall for various reasons, such as waiting for memory accesses to complete or waiting for long instructions to complete.

Each pending workgroup 402 has one or more pending instructions 403 that represent instructions to be executed by the functional units 406. In some examples, the pending instructions 403 include the next instruction in program order. In some examples, the pending instructions 403 include more than one instruction for one or more workgroups 402. In an example, the pending instructions include 403 the next instruction in program order and then the next instruction after that instruction in program order.

The arbiter 404 examines the pending instructions 403 and decides whether to issue instructions at a normal execution rate or at an increased execution rate. As stated elsewhere herein, the functional units 406 have sufficient resources to execute instructions at least at a normal execution rate in general. However, the functional units 406 do not have sufficient resources to execute instructions at the increased execution rate in all situations. At least two resources sometimes limit execution to the normal execution rate: register file bandwidth and functional unit execution resources. Regarding the register file bandwidth, it is possible that the pending instructions 403 are of a nature that requires more bandwidth than exists to the register files. In such a situation, the SIMD unit 138 is unable to operate at the increased execution rate and operates at the normal execution rate. Regarding functional unit execution resources, it is possible that there are no pending instructions 403 that could be executed together due to too few execution resources existing in the functional units 406. In such a situation, the SIMD unit 138 executes at the normal execution rate. If there are sufficient resources to execute at least two pending instructions 403 together, then the SIMD unit 138 executes at the increased execution rate. The term "execute together" means that the functional units 406 perform operations for multiple instructions in the same clock cycle(s) that, if not executed together, would be performed in different clock cycle(s). In an example, if an instruction is an addition instruction, executing two instructions together means performing an addition operation for each instruction in a single clock cycle. In this example, executing two instructions together is contrasted with not executing two instructions together, in which the addition operations for the two different instructions are performed in different clock cycles. It should be noted that instructions are pipelined, meaning that instruction execution involves multiple suboperations, each of which is performed in one or more clock cycles. For executing instructions together, a lane of the SIMD unit 138 is capable of executing multiple suboperations for different instructions in the same cycle(s).

As described elsewhere herein, one reason that the SIMD units 138 are capable of executing at the higher execution rate is that there are sufficient functional units 406 to execute multiple instructions together because some instructions are complex and require a large number of "simple" functional units. Thus in some examples, executing instructions together means executing multiple instructions in the same clock cycle(s), where at least one such instruction is a "simple" instruction that uses a "simple" functional unit that in other cycles is used by a complex instruction. In an example, two addition instructions are executed together, and at least one such addition instruction uses an adder that is used for a matrix multiplication instruction executed at a different time.

As described above, the numbers of functional units sometimes limit whether multiple instruction are able to be executed together. More specifically, because the lanes do not include duplicate hardware to execute multiple instances of every instruction in the instruction set architecture, the SIMD unit 138 is unable to execute certain types of instruction combinations together. Specifically, the SIMD unit 138 is unable to execute together two instances of an instruction for which two instances of the functional units required to execute that instruction are not present in the functional units 406. However, it is sometimes possible for one instruction of a very simple type and another instruction of a more complex type to execute together in the event that there are sufficient functional units to do so. In an example, addition, multiply, and fused-addition-multiply instructions can execute together. Other examples of simple instructions include simple mathematical instructions (e.g., subtract), bit manipulation instructions (e.g., bitwise AND, OR, XOR, shift, or the like), or other instructions. Some "co-executable complex instructions" are instructions for which sufficient hardware does not exist for multiple such instructions to execute together. Thus the arbiter 404 does not select multiple of such instructions to execute together. However, the SIMD unit 138 does have sufficient hardware to execute a co-executable complex together with a simple instruction. Thus the arbiter is permitted to select a co-executable complex instruction to execute together with a simple instruction. Finally, some "non-co-executable complex instructions" either consume too many cycles or consume too many functional units 406 to be executable together with the simple instructions. Thus the SIMD unit 138 never executes non-co-executable complex instructions together with any other instructions.

In FIG. 4, the functional units 406 include simple functional units 408 and additional logic for complex instructions 410. The simple functional units 408 are functional units for executing simple instructions. In various examples, the simple functional units 408 include adders, multipliers, bitwise manipulation instructions, and the like. The additional logic for complex instructions 410 includes hardware for the co-executable complex instructions and for the non-co-executable complex instructions. The simple functional units 408 are shared between the simple instructions and at least some of the additional logic for complex instructions 410. For example, adders and multipliers are used for addition and multiplication instructions, as well as more complex instructions that use multiplication and addition.

As stated above, the arbiter 404 is able to select pending instructions 403 for execution in the situation that those pending instructions 403 have register access requirements that fit within the register file bandwidth. In some examples, register file bandwidth refers to bandwidth available at register file ports. A register file port is an interface that allows the functional units 406 to access contents of registers, and a limited number of register file ports exist. In an example, a vector register file 412 has four ports, each of which is capable of providing a certain number of bits per clock cycle such as 64 bits. In the event that the arbiter 404 cannot find multiple pending instructions 403 that fit within the bandwidth of the vector register file 412, the arbiter 404 determines that the SIMD unit 138 is to execute at a normal execution rate. Multiple instructions "fit within" the bandwidth in the event that there is sufficient bandwidth to access all operands of all instructions to execute together.

Register file bandwidth is further extended by the fact that in some examples, there are different types of register files, each with their own independent bandwidth. In an example, a SIMD unit 138 includes a vector register file 412 and a scalar register file 414. The vector register file 412 has vector register file ports and the scalar register file 414 has scalar register file ports. The vector register file ports are accessed independently from the scalar register file ports. Thus the bandwidth available is increased for sets of instructions that access different register files as compared with sets of instructions that access the same register file. In an example, a first instruction accesses three vector register file registers and a second instruction accesses two vector register file registers and one scalar register file register. A third instruction accesses three vector register file registers. The first and second instructions are less likely to have a register file bandwidth conflict than the first and third or second and third.

In some examples, instructions access operands in the register files based on which "slot" the operands are in. More specifically, instructions refer to registers in a particular order. The place of a register in this order defines a slot. In some implementations, the registers for an instruction are accessed in different clock cycles, and the particular cycle at which registers are accessed is dependent on the slot of the register. In some implementations, instructions that execute together access operands of the same slot in the same clock cycle(s). In an example, two instructions that execute together access the registers of a first slot in the same clock cycle. Thus if there is sufficient bandwidth to access the registers of each slot of two instructions, then those two instructions can be executed together, and if there is not sufficient bandwidth, then the two instructions cannot be executed together. In an example, two instructions access two vector registers in their first slot. If the vector register file 412 has sufficient bandwidth to satisfy these two accesses in the clock cycle for the first slot, then the arbiter 404 is able to schedule those two instructions for execution together, and if not, then the arbiter 404 is not able to schedule those two instructions for execution together.

There are a number of aspects that the arbiter 404 considers in determining whether register accesses for two instructions fit into the available register access bandwidth. One aspect includes a comparison between the amount of bandwidth needed by the instructions and whether such bandwidth is available. In one example, a certain number of register file ports are available for register access. Each port can provide access to a certain number of bits per clock cycle, and access to registers requires a certain number of such bits. In an example, a first instruction accesses three 32-bit vector registers and a second instruction accesses one 64-bit vector register and two 32-bit registers. In this example, there are three ports to the vector register file 412, and each provides 64 bits of bandwidth. In this instance, the amount of bits required (5×32+64=224) is greater than the number of bits available (192), and so such instructions could not be executed together. In another example, a first instruction accesses two 32 bit registers and a second instruction accesses three 32 bit registers. In this example, the instructions could be executed together, provided another conflict does not exist.

In some implementations, the ports are able to provide a single or double data rate. In these implementations, each "half" of the port is capable of accessing a different bank of the register file. A bank of the vector register file is a portion of the register file that includes a set of registers that are mutually exclusive with the registers assigned to a different bank. A port is able to provide an enhanced rate of access to registers of a register file in the case that the data for the port is sourced from two different banks. In an example, odd registers are in one bank and even registers are in another bank. Thus when considering whether bandwidth is available for the register accesses for instructions, the arbiter 404 considers whether the registers being accessed are found in different banks, which can increase or limit the bandwidth available.

Another aspect includes the register file types of the registers being accessed. Specifically, as described above, register files of different types have their own independent bandwidth. In an example, the vector register file 412 has 3 ports, each able to access 64 bits, and the scalar register file 414 also has 3 ports, each able to access 64 bits. Thus if two instruction have a mix of vector and scalar registers, the arbiter 404 considers whether there is sufficient bandwidth across both the vector register file 412 and the scalar register file 414.

Another aspect includes whether register values can be accessed from entities other than the register file, in order to reduce the amount of bandwidth necessary to be directly accessed via the register file(s). Some such entities include forwarding circuitry in the SIMD unit 138 execution pipeline, operand caches, or register values used as other operands or instructions. Forwarding circuitry is circuitry that compensates for data hazards that occur in the execution pipeline. A data hazard is a situation where one instruction in the pipeline writes to a register that is read by another instruction in the pipeline. If that other instruction were to fetch the value of the register from the register file, then this might occur before the value produced by the first instruction were written to the file, and the other instruction could read stale data. The forwarding circuitry prevents this from happening by providing values that would be written to the instruction. This forwarding circuitry does not occupy bandwidth of the register file. Thus, if value forwarding occurs in this manner, the bandwidth of the register files is effectively increased. Instructions that execute close together in program order (e.g., within a number of cycles that instruction take to be executed by the pipeline) often use forwarded data. Operand caches cache register values. If an instruction is able to obtain values from such operand caches, then this increases the effective register file bandwidth. Register values may be duplicated, meaning that a register value may be used twice or more times across one or more instructions. In this instance, only one access consumes register file bandwidth.

In summary, the arbiter 404 is able to select two (or more) instructions to execute in parallel in the situation that there are sufficient functional units 406 to execute those two instructions, and in the situation that there is sufficient register file bandwidth. There are sufficient functional units 406 in the event that the two instructions have instruction types such that each lane includes functional units 406 to execute both those types together. There is sufficient register file bandwidth in the event that the operands accessed by the two instructions fit within the available register file bandwidth.

Periodically (e.g., every clock cycle, or every time the arbiter 404 is ready to schedule instructions for execution), the arbiter 404 makes a determination regarding which instruction(s) to execute and whether multiple instructions can be executed together. The arbiter 404 considers one or more combinations of pending instructions 403 and determines whether such one or more combinations meet the criteria set forth herein for being able to execute together. Such combinations are referred to as "eligible combinations." The arbiter 404 selects one such combination to execute together in the situation that such a combination exists, and causes such combination of instructions to execute together. The arbiter 404 does not cause any combination of instructions to execute together if no such combination exists, and in that instance, causes one instruction to execute. In various examples, the arbiter 404 selects an eligible combination with highest priority, as determined by a priority assignment operation. Priority is determined in any technically feasible manner, such as a priority that facilitates round robin execution, priority that helps make forward progress, or priority determined in any other technically feasible manner. In some examples, if an instruction with the highest priority is not co-executable with any other instruction, but has the priority, then the arbiter 404 selects that instruction for execution alone.

Figure 5:
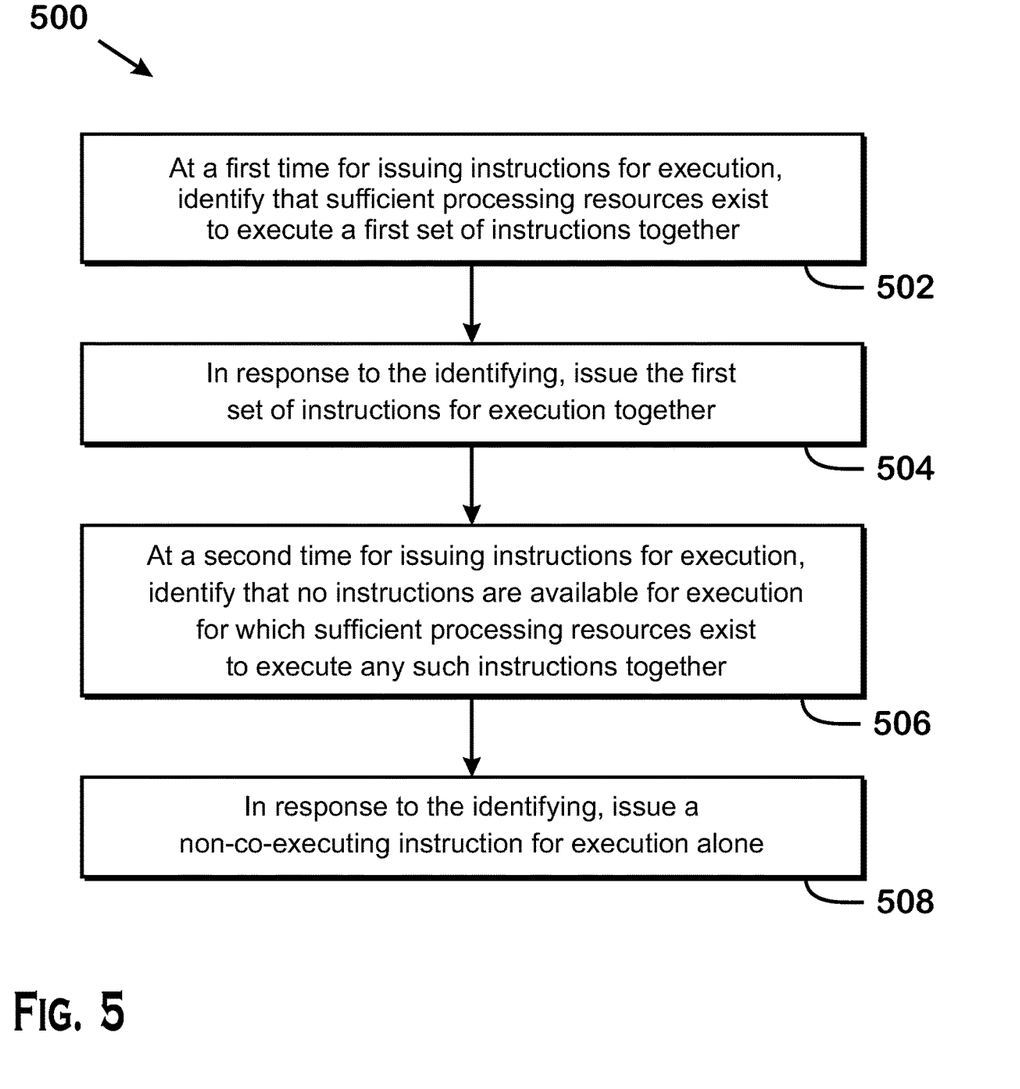
FIG. 5 is a flow diagram of a method for executing instructions, according to an example.

FIG. 5 is a flow diagram of a method 500 for executing instructions, according to an example. Although described with respect to the system of FIGS. 1-4, those of skill in the art will recognize that any system, configured to perform the steps of the method 500 in any technically feasible order, falls within the scope of the present disclosure.

At step 502, the arbiter 404 is operating at a first time for issuing instructions for execution. It should be understood that the arbiter 404 selects instructions for execution at various times, such as every cycle, as long as resources are available for new instructions. The arbiter 404 identifies that sufficient processing resources exist to execute a first set of instructions together. In some examples, executing the instructions together means that at least one operation for each of the instructions is performed with the same lane of a SIMD unit 138 in the same cycle(s). In some examples, executing the instructions together means that at least one operation of at least one of the instructions is performed with hardware that is used for complex instructions (for example, one of the adders that would be used for matrix multiplication or other more complex instructions). In some examples, executing the instruction together means that the execution rate of the instructions is increased beyond the "normal" execution rate of the instructions. In some examples, the normal execution rate is the rate at which instructions can execute even if there are conflicts for functional units and/or register bandwidth for each instruction. In some examples, the normal execution rate is the rate that one lane of the SIMD unit 138 has sufficient hardware to guarantee execution at, assuming no other reasons for stalling (such as waiting for data to be fetched from memory). In some examples, the normal execution rate is a single rate execution rate and the increased execution rate is a double execution rate. In some examples, the instructions to be executed together are from different wavefronts, and in other examples, the instructions to be executed together are from the same wavefront. In examples where the instructions to be executed together are from different wavefronts, executing these instructions together allows operations for two wavefronts to progress in the same time that operations from only one wavefront would progress if no instructions could execute together. In an example, where instructions can be executed together, one instruction for each of two wavefronts are able to complete per cycle (or per a certain number of cycles), whereas without being able to execute such instructions together, an instruction from only one wavefront could complete per cycle (or per certain number of cycles).

Step 502 involves identifying that there is sufficient processing resources to execute instructions together. In some examples, such processing resources include register file bandwidth and functional units. In some examples, each lane has sufficient functional units 406 to execute certain combinations of instruction types together, but not other combinations of instruction types. In an example, complex instructions such as matrix multiplication require a large number of certain types of functional units such as adders and multipliers. Further, because each lane is capable of execute each instruction type, each lane includes at least one copy of these different functional units. Thus each lane includes multiple copies of functional units for performing simpler instructions such as simple addition or multiplication operations. Thus, in one example, sufficient processing resources exist for two instructions in the event that the instructions are of a type for which at least one copy of the functional units for executing those instructions exist.

In some examples, register file bandwidth includes bandwidth to one or more register files such as a vector register file 412 and a scalar register file 414. In some examples, the instructions consume register file bandwidth based on specified operands. More specifically, instructions are capable of specifying operands by register name. In addition, these operands implicitly or explicitly include an amount of data needed to be transferred. In one example, operands are 32 bit operands or 64 bit operands. The arbiter 404 determines that register file bandwidth is sufficient if the amount of data specified for the multiple instructions is less than the available bandwidth to the registers specified. In various examples, a vector register file 412 and a scalar register file 414 have independent bandwidth, meaning that accesses to the vector register file 412 do not consume bandwidth of the scalar register file 414 and accesses to the scalar register file 414 do not consume bandwidth to the vector register file 412. In addition, it is possible for certain register accesses to not consume bandwidth for other reasons, such as the SIMD unit 138 being able to access the operands from a different location, such as a cache or forwarding circuitry. Operands that do not reference registers (such as literal values) do not consume register file bandwidth. In some examples, there are restrictions on register file access. For example, in some examples, in order to access the full bandwidth, accesses must be to two (or more) different banks of the register files. In some examples, maximum bandwidth is accessible if all banks are used, and bandwidth is restricted if register accesses lean towards a particular bank. In an example, the vector register file 412 includes two banks. Further, register accesses for two instructions utilize the full bandwidth and are distributed equally among the banks. In that situation, there is sufficient bandwidth to execute the instructions together. In another example, register accesses for two instructions utilize the full bandwidth but are heavily skewed towards one bank. In such an example, there is not sufficient bandwidth to execute the instructions together.

Step 502 includes determining both that there are sufficient functional units to execute the instructions together and that there is sufficient register bandwidth to execute the instructions together. At step 504 in response to this determination, the arbiter 404 issues the first set of instruction for execution together. It should be understood that in some implementations, during operation, the arbiter 404 sometimes selects between two or more sets of instructions that quality for execution together. In some examples, this selection occurs based on a priority mechanism.

At step 506, the arbiter 404 determines that there are no sets of instructions that meet the criteria for execution together. In one example, this determination occurs because an instruction that is unable to execute with any other instruction (e.g., due to using too many functional units 406) has the highest priority (and thus must execute). In other examples, this determination occurs because the arbiter 404 cannot find any sets of instructions that meet the criteria described with respect to step 502. At step 508, in response to the determining of step 506, the arbiter 404 issues one instruction, instead of issuing multiple instructions together.

It should be understood that the arbiter 404 performs the steps of the method 500 continuously to issue instructions for execution. Further, while the method 500 includes one iteration in which the arbiter 404 selects instructions for execution together and one iteration in which the arbiter 404 selects an instruction not for execution with any other instruction, it should be understood that this particular pattern is only illustrative, and that the arbiter 404 is free to select instructions for execution together or not together as the runtime circumstances warrant.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the command processor 136, the graphics processing pipeline 134, the compute units 132, the SIMD units 138, the system 400, or the register allocator 402, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   at a first time for issuing instructions for execution, determining that, for a first set of instructions, bandwidth consumed by operands of the instructions of the first set of instructions is less than bandwidth available in register files, wherein the bandwidth available is based on operand slots; and
   in response to the determining, executing the first set of instructions together, wherein instructions that execute together access registers of a first slot together in a first clock cycle and access registers of a second slot together in a second clock cycle.

2. The method of claim 1, wherein the bandwidth comprises bandwidth available at ports of the register files.

3. The method of claim 2, wherein the ports comprise interfaces that allow functional units configured to execute instructions that access contents of registers of the register files.

4. The method of claim 1, wherein the bandwidth includes bandwidth for different types of register files.

5. The method of claim 4, wherein the different types of register files include a vector register file type and a scalar register file type.

6. The method of claim 4, wherein different types of register files have independently available bandwidth.

7. The method of claim 1, wherein the executing of the first set of instructions together is performed in response to also identifying that sufficient functional units exist within a processing lane to execute at least one operation of each instruction of the first set instructions in the same clock cycle.

8. A compute unit, comprising:
   a memory configured to store instructions; and
   a processor, configured to:
      at a first time for issuing instructions for execution, determine that, for a first set of the instructions, bandwidth consumed by operands of the instructions of the first set of instructions is less than bandwidth available in register files, wherein the bandwidth available is based on operand slots; and
      in response to the determining, executing the first set of instructions together, wherein instructions that execute together access registers of a first slot together in a first clock cycle and access registers of a second slot together in a second clock cycle.

9. The compute unit of claim 8, wherein the bandwidth comprises bandwidth available at ports of the register files.

10. The compute unit of claim 9, wherein the ports comprise interfaces that allow functional units configured to execute instructions that access contents of registers of the register files.

11. The compute unit of claim 8, wherein the bandwidth includes bandwidth for different types of register files.

12. The compute unit of claim 11, wherein the different types of register files include a vector register file type and a scalar register file type.

13. The compute unit of claim 11, wherein different types of register files have independently available bandwidth.

14. The compute unit of claim 8, wherein the executing of the first set of instructions together is performed in response to also identifying that sufficient functional units exist within a processing lane to execute at least one operation of each instruction of the first set instructions in the same clock cycle.

15. A non-transitory computer-readable medium storing instructions that, when executed by a processor, cause the processor to perform operations comprising:
   at a first time for issuing instructions for execution, determining that, for a first set of instructions, bandwidth consumed by operands of the instructions of the first set of instructions is less than bandwidth available in register files, wherein the bandwidth available is based on operand slots; and
   in response to the determining, executing the first set of instructions together, wherein instructions that execute together access registers of a first slot together in a first clock cycle and access registers of a second slot together in a second clock cycle.

16. The non-transitory computer-readable medium of claim 15, wherein the bandwidth comprises bandwidth available at ports of the register files.

17. The non-transitory computer-readable medium of claim 16, wherein the ports comprise interfaces that allow functional units configured to execute instructions that access contents of registers of the register files.

18. The method of claim 1, further comprising:
   at a second time for issuing instructions for execution, second determining that there is no set of two or more available instructions for which bandwidth consumed by operands is less than the bandwidth available in the register files; and
   in response to the second determining, executing an available instruction independently of any other instruction.

19. The compute unit of claim 8, wherein the processor is further configured to:
   at a second time for issuing instructions for execution, second determining that the instructions do not include a set of two or more available instructions for which bandwidth consumed by operands is less than the bandwidth available in the register files; and
   in response to the second determining, executing an available instruction independently of any other instruction.

20. The non-transitory computer-readable medium of claim 15, wherein the operations further comprise:

at a second time for issuing instructions for execution, second determining that there is no set of two or more available instructions for which bandwidth consumed by operands is less than the bandwidth available in the register files; and in response to the second determining, executing an available instruction independently of any other instruction.

\* \* \* \* \*